2,611,281

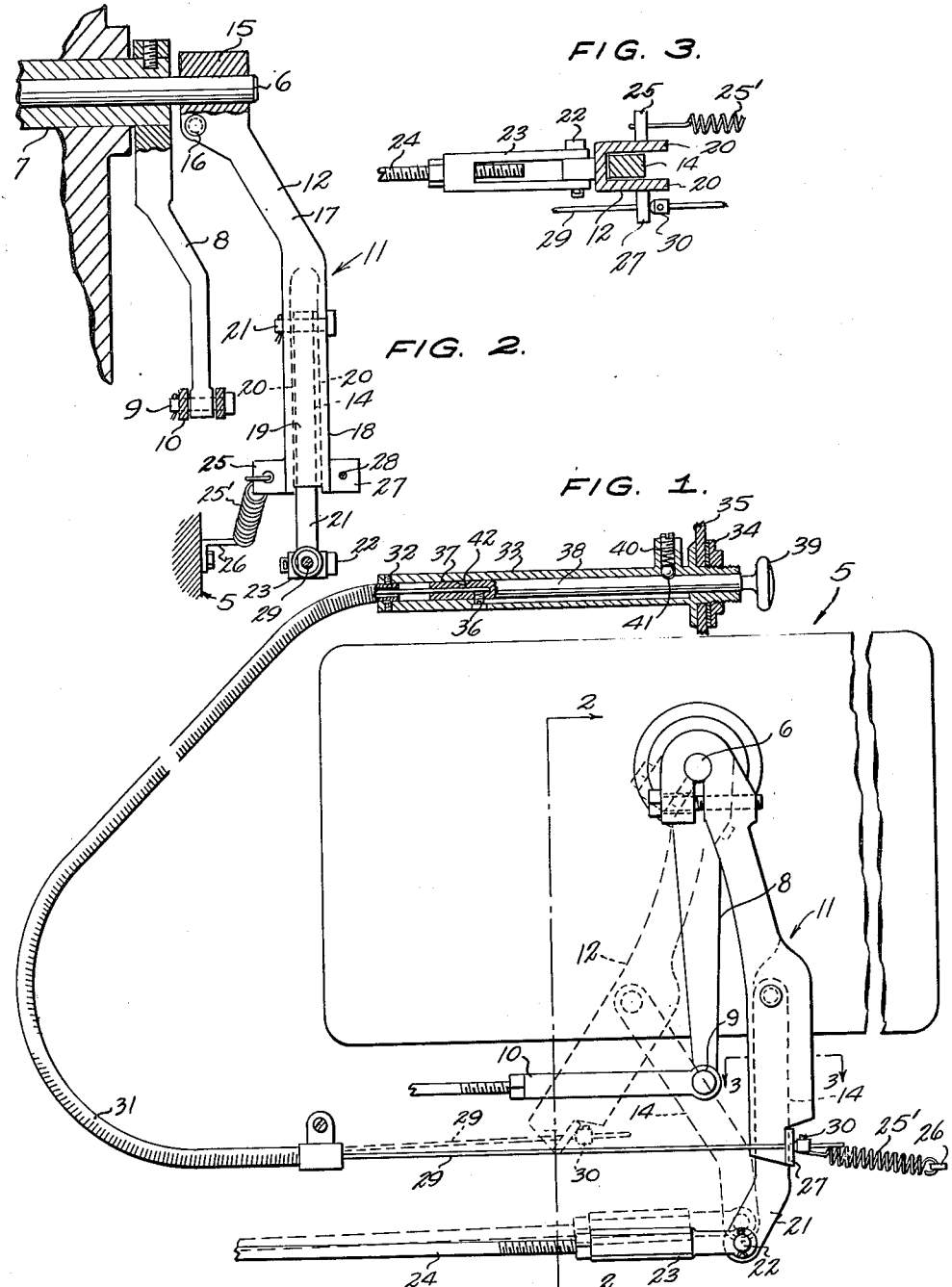
Sept. 23, 1952    H. W. GRAY ET AL    2,611,281
SHIFT DELAY
Filed Feb. 3, 1950
INVENTORS
HAROLD W. GRAY,
CLARENCE I. NICOSON,
BY
McMorrow, Berman & Davidson
ATTORNEYS Patented Sept. 23, 1952

UNITED STATES PATENT OFFICE 2,611,281

SHIFT DELAY

Harold W. Gray and Clarence I. Nicoson,
San Luis Obispo, Calif.

Application February 3, 1950, Serial No. 142,116

2 Claims. (Cl. 74—472)

This invention relates to a shift delay for an automatic transmission, such as an automobile transmission, the primary object of the invention being to provide means whereby the driver of an automobile equipped with such as an automatic transmission can, whenever desired lock out normal automatic shifting of the transmission at the usual relatively low speed ranges and cause the transmission to automatically shift at higher speed ranges, in a manner enabling the driver to exert more positive control of acceleration and deceleration of the automobile to meet varying road conditions by throttle operation between the speed ranges without causing the transmission to shift to higher speed ranges, thereby reducing the dangers of skidding and loss of engine braking force otherwise present when negotiating mountain road grades and curves due to substantially constant upshifting and downshifting of the transmission and reducing the necessity otherwise present for extreme and sudden depression of the acceleration pedal to obtain shifting to a lower range when road conditions require, thereby reducing jerky operation of the automobile and waste of gasoline.

Another important object of the invention is to provide control means of the character indicated above which involves substituting for the standard one-piece shift control lever present on an automatic transmission, an articulated two-piece shift delay control lever and a Bowden wire cable manual control and locking means for actuating the two-piece lever and locking the same in shift delaying position, the arrangement being such that the engine throttle linkage connected to the two-piece lever is free for operation by the driver.

Other important objects and advantageous features of the invention will be apparent from the following description and the accompanying drawings wherein for purposes of illustration, a specific embodiment of the invention is set forth in detail.

In the drawings:

Figure 1 is a contracted side elevation of an automatic transmission showing the range selector lever and the shift delay lever on concentric shafts, with the manual actuating means and its locking means shown in section, the shift delay lever being shown in inoperative position in full lines and in operative position in dotted lines.

Figure 2 is a fragmentary transverse vertical section, taken on the line 2—2 of Figure 1; and, Figure 3 is a horizontal section taken on the line 3—3 of Figure 1.

Referring in detail to the drawings, wherein like numerals designate like parts throughout the several views, the numeral 5 generally designates the case of an automatic automobile transmission from whose left hand side project inner and outer concentric shafts 6 and 7, respectively. Clamped and locked on the outer shaft 7 is a standard depending range selector lever 8 to whose lower end is pivoted at 9 a forwardly extending positioning rod 10 to which is connected in a usual manner the manual selecting lever (not shown) on the steering column of the automobile. The range selector lever is not involved in the present invention except to the extent that it is left undisturbed for operation in the usual manner.

In the place of the standard one-piece shaft control lever on the inner shaft 6 the present invention substitutes the delay shift control lever 11 comprising the upper section 12 and the lower section 14. The upper section 12 involves a conventional U-shaped clamp head 15 on its upper end to embrace the shaft 6 outside of the range selector lever 8 and a clamping bolt 16 whereby the upper section is fixed in position on the shaft 6. The upper portion 17 of the upper section is angularly offset in a laterally outward direction, as shown in Figure 2, and in a rearward direction, as shown in Figure 1. The upper section 12 has a rearwardly facing lower portion 18 of channel cross section depending perpendicularly from the lower end of the upper portion 17 and providing a web 19 between spaced side flanges 20, 20.

A pivot 21 traversing the flanges 20 at the upper end of the channel portion 18 provides pivotal support for the upper end of the lower section 14 which is in the form of a straight, flat-sided bar fitting movably between the flanges 20 and having a forwardly declining lower end portion 21 projecting downwardly beyond the lower end of the upper section 12. The lower end of the lower section 14 has pivoted thereto at 22 the clevis 23 of the usual throttle rod linkage 24 which extends forwardly and is connected in the usual manner with the carburetor throttle operating mechanism (not shown). Normally, when the throttle of the automobile engine is opened by the driver's tramping on the accelerator pedal, the shift control lever 11 is swung toward the left in Figure 1 in accordance with the amount of endwise movement of the throttle rod 24 toward the left from the normal or inoperative position of the lever 11.

On the laterally inward side of and at the lower end of the inner flange 20 of the upper section 12 is an inner ear 25, and a helical contractile spring 25' is stretched between the ear 25 and an anchor 26 positioned rearwardly therefrom on the transmission case, the action of the spring 25' being to return the delay lever 11 to the normal or neutral or inoperative position shown in Figure 1 in full lines from the operated position thereof shown in dotted lines in Figure 1.

An outer ear 27 similar to the ear 25 projects from the lower end of the outer flange 20 of the upper section 12 and is formed with a hole 28 through which slides a Bowden wire 29. Behind the ear 27 a stop 30 is secured to the Bowden wire to engage the back of the ear 27 when the Bowden wire is pulled forwardly, but the upper section 12 is free to move forwardly relative to the wire 29 and its stop 30.

The Bowden wire 29 leads upwardly and rearwardly through a cover 31 anchored at 32 in the forward end of a horizontal rigid tube 33 mounted at 34 through the automobile instrument panel or other suitable support 35. The adjacent end of the Bowden wire 29 is clamped by a set screw 36 in an axial socket 37 in the forward end of a plunger rod 38 slidable in the tube 33 and having a knob 39 on its rear end exposed at the rear end of the tube 33. The tube 33 has a spring pressed ball detent 40 on its upper side arranged to lockingly engage in a rearward depression 41 in the plunger rod 38 in the inoperative position of the shift delay lever 11 or in another forward depression 42 in the rod to lock the lever 11 in operative position. It is obvious that when the knob 39 is pulled rearwardly from the position shown in Figure 1 the lower end of the upper section 12 of the shift delay lever 11 will be swung forwardly into the dotted line position shown in Figure 1 and that the upper end of the lower section will be swung forwardly into the dotted line position shown. It will be noted that in both the inoperative and operative positions of the shift delay lever 11 the position of the pivotal connection of the lower end of the lower section 14 with the throttle linkage rod 24 remains substantially the same while the inner shaft 6 occupies a rearwardly rotated position in the operative position of the shift delay lever. This correspondingly retards the setting of the shaft 6 and of the usual mechanism (not shown) operated by the shaft 6 which is within the transmission case.

It will also be noted that the above described arrangement of the upper and lower sections 12 and 14, respectively, of the shift delay lever 11 relative to each other and to the Bowden wire 29 and its stop 30 permits the engine throttle rod linkage 24 to be moved independently of the lever 11 while the lever 11 is in its forward operative position. This arrangement enables the driver to depress or slack off the accelerator pedal (not shown) to accelerate or decelerate the road speed of the automobile without causing up-shifting or down-shifting of the transmission, within the subsisting driving range.

The usual setting of the standard shift lever (not shown) on the inner shaft 6 is such that automatic up-shifting of the transmission occurs at approximately 4, 12 and 18 miles per hour car speeds, on normal throttle operation. The shift delay lever 11 of the instant case is, however, set on the inner shaft 6 in such position that the transmission up-shifts from first to second speed at from 14 to 16 miles per hour, from second to third speed at from 34 to 38 miles per hour, and from third to fourth speed at 70 miles per hour.

Thus, when encountering mountain grades and curves and/or ice conditions, the knob 39 is pulled out to obtain the car control advantages mentioned and to eliminate continuous automatic shifting by the transmission. For instance with the device in operation under such conditions the transmission shifts to third speed at about 55 miles per hour without apparent noise or jerk. An accelerator pedal controlled range of from 20 miles per hour to 70 miles per hour is thereby provided which enables the driver to use engine braking on approaching a curve at high speed by slacking off the accelerator pedal to slow down the automobile without causing the transmission to automatically shift into fourth speed. After passing the curve it is not necessary, as without the present device, to jam the accelerator pedal to the floorboards to get the transmission back into third gear from the low accelerating and low engine braking fourth gear, because the fourth gear is in effect locked out below the top speed setting such as 70 miles per hour of the lever 11. Beyond this high speed setting the transmission goes automatically into fourth gear.

The operation of the transmission is in no way impaired by the operation of the invention and the engine of the automobile is saved wear and tear. Pushing in of the knob 39 from a pulled out position returns the transmission to ordinary operation.

What is claimed is:

1. In an automotive power plant involving an engine having a throttle and operating linkage therefor, an automatic transmission having a shifting shaft and a shifting lever connected thereto and extending radially therefrom, means yieldably maintaining said shaft and lever in normal position in which the transmission shifts automatically in normal manner, said shifting lever comprising a first section having one end fixed on said shifting shaft, said first section having a portion adjacent the other end thereof of channel cross section, a second section extending longitudinally of and receivable within said channel portion of said first section and having one end pivotally connected to said channel portion, the other end of said second section being beyond and spaced from said other end of said first section and pivotally connected to said throttle linkage, an ear exteriorly of said first section adjacent the other end thereof, and manual means connected to said ear for moving said first section away from said second section.

2. In an automotive power plant including an engine having a throttle and operating linkage therefor, an automatic transmission having a shifting shaft, said shifting shaft having a normal position in which the transmission shifts automatically in a normal manner, means yieldably maintaining said shifting shaft in its normal position, a shift delay lever comprising a first section having one end fixed on said shifting shaft, said first section having a portion adjacent the other end thereof of channel cross section, a second section extending longitudinally of and receivable within said channel portion of said first section and having one end pivotally connected to said channel portion, the other end of said second section being beyond and spaced from said other end of said first section and pivotally connected to said throttle linkage, an ear exteriorly of said first section adjacent the other end thereof, manual means connected to said ear for moving said first section away from said second section, and spring means operatively connected to said first section adjacent the other end thereof for biasing said first section toward said second section.

HAROLD W. GRAY.
CLARENCE I. NICOSON.

REFERENCES CITED

The following references are of record in the file of this patent:

UNITED STATES PATENTS

| Number | Name | Date |
|---|---|---|
| 2,071,292 | Woolson | Feb. 16, 1937 |
| 2,071,785 | Ehrlich | Feb. 23, 1937 |
| 2,120,555 | Good | June 14, 1938 |
| 2,193,304 | Thompson | Mar. 12, 1940 |
| 2,208,643 | Neracher | July 23, 1940 |
| 2,329,724 | Maurer | Sept. 21, 1943 |
| 2,343,955 | Cotterman | Mar. 14, 1944 |
| 2,577,660 | Krueger | Dec. 4, 1951 |